US012218855B2

(12) United States Patent
Narsale et al.

(10) Patent No.: US 12,218,855 B2
(45) Date of Patent: Feb. 4, 2025

(54) RDMA TRANSMIT FLOW SCHEDULING AND PACING SCHEME FOR CONGESTION MANAGEMENT IN HIGH-PERFORMANCE AI/ML NETWORKS

(71) Applicant: META PLATFORMS, INC., Menlo Park, CA (US)

(72) Inventors: Ashay Narsale, Newark, CA (US); Arvind Srinivasan, San Jose, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 78 days.

(21) Appl. No.: 18/108,541

(22) Filed: Feb. 10, 2023

(65) Prior Publication Data

US 2024/0275736 A1 Aug. 15, 2024

(51) Int. Cl.
*H04L 47/6275* (2022.01)
*H04L 67/1097* (2022.01)

(52) U.S. Cl.
CPC ...... *H04L 47/6275* (2013.01); *H04L 67/1097* (2013.01)

(58) Field of Classification Search
CPC .................. H04L 47/6275; H04L 67/1097
USPC ....................................................... 709/238
See application file for complete search history.

(56) References Cited

U.S. PATENT DOCUMENTS

| 2003/0195983 | A1* | 10/2003 | Krause | H04L 47/28 |
| | | | | 709/238 |
| 2009/0019113 | A1* | 1/2009 | Wu | H04L 12/1881 |
| | | | | 709/204 |
| 2019/0306239 | A1* | 10/2019 | Das | H04L 49/15 |
| 2021/0320866 | A1* | 10/2021 | Le | H04L 47/115 |
| 2022/0182331 | A1* | 6/2022 | Danivas | H04L 67/1097 |
| 2023/0344777 | A1* | 10/2023 | Brar | H04L 67/1097 |
| 2023/0403233 | A1* | 12/2023 | Rahman | H04L 49/9047 |

FOREIGN PATENT DOCUMENTS

| CN | 115118668 A | * | 9/2022 | .............. H04L 47/11 |
| CN | 115314442 A | * | 11/2022 | ........... H04L 47/225 |
| WO | WO-2020108020 A1 | * | 6/2020 | ............. H04L 45/38 |
| WO | WO-2023058232 A1 | * | 4/2023 | |

* cited by examiner

*Primary Examiner* — Ruolei Zong
(74) *Attorney, Agent, or Firm* — BakerHostetler

(57) ABSTRACT

A system for facilitating RDMA transmit flow scheduling and pacing is disclosed. The system may determine a set of groups. The groups may be associated with a range of transmission rates. The system may determine a transmission rate of a queue pair. The system may assign the QP to a first group of the set of groups. The transmission rate of the QP may be within the range of transmission rates of the first group. The system may determine an available QP of at least one group from the set of groups. The system may schedule transmission, by an arbiter, of the available QP. The system may transmit, by the arbiter, a message associated with the available QP.

20 Claims, 5 Drawing Sheets

RDMA TRANSMIT FLOW SCHEDULING AND PACING SCHEME FOR CONGESTION MANAGEMENT IN HIGH-PERFORMANCE AI/ML NETWORKS

TECHNICAL FIELD

The present description generally relates to computer networks and, more particularly, to systems and methods of Remote Direct Memory Access (RDMA) transmit flow scheduling and pacing for congestion management in high-performance artificial intelligence (AI) and machine learning (ML) networks.

BACKGROUND

Remote Direct Memory Access allows for direct access of memory from memory of one device to the memory of another device. RDMA may help increase the efficiency of data centers by providing low latency and high throughput data transfers. High-performance artificial intelligence and machine learning applications may utilize high bandwidth network communication and predictable tail latency. Congestion on the network may directly affect the tail latencies and thereby affect the performance of the end applications. Therefore, there is a need to manage congestion in high-performance AI/ML applications.

BRIEF SUMMARY

An aspect of the subject technology may include a method that includes determining a set of groups, wherein groups in the set of groups may be associated with a range of transmission rates. The method may also include determining a transmission rate of a queue pair (QP). The method may also include assigning the QP to a first group of the set of groups. The transmission rate of the QP is within the range of transmission rates of the first group. The method may also include determining an available QP associated with at least one group from the set of groups. The method may also include scheduling transmission, by an arbiter, of the available QP. The method may also include transmitting, by the arbiter, a message associated with the available QP.

Another aspect of the subject technology may include an apparatus that includes one or more processors and at least one memory. The memory may store instructions that, when executed by the one or more processors, cause the apparatus to determine a set of groups, wherein groups in the set of groups may be associated with a range of transmission rates. The memory and instructions are also configured to, with the one or more processors, cause the apparatus to determine a transmission rate of a queue pair (QP). The memory and instructions are also configured to, with the one or more processors, cause the apparatus to assign the QP to a first group of the set of groups. The transmission rate of the QP is within the range of transmission rates of the first group. The memory and instructions are also configured to, with the one or more processors, cause the apparatus to determine an available QP associated with at least one group from the set of groups. The memory and instructions are also configured to, with the one or more processors, cause the apparatus to schedule transmission of the available QP. The memory and instructions are also configured to, with the one or more processors, cause the apparatus to transmit a message associated with the available QP.

Yet another aspect of the subject technology may include a computer program product including at least one computer-readable storage medium having computer-executable program code instructions stored therein. The computer-executable program code instructions may include program code instructions configured to determine a set of groups, wherein groups in the set of groups may be associated with a range of transmission rates. The computer-executable program code instructions may include program code instructions configured to determine a transmission rate of a queue pair (QP). The computer-executable program code instructions may include program code instructions configured to assign the QP to a first group of the set of groups. The transmission rate of the QP is within the range of transmission rates of the first group. The computer-executable program code instructions may include program code instructions configured to determine an available QP associated with at least one group from the set of groups. The computer-executable program code instructions may include program code instructions configured to schedule transmission, by an arbiter, of the available QP. The computer-executable program code instructions may include program code instructions configured to transmit, by the arbiter, a message associated with the available QP.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more other embodiments of the subject technology. In one or more embodiments of the subject technology, structures and components are shown in block diagram form in order to avoid obscuring the concepts of the subject technology.

As defined herein, a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, incasts may, for example, be transmitter endpoints transmitting data, traffic, content, or the like, to associated receiver endpoints.

As referred to herein, outcasts may, for example, be a source of transmitted data, traffic, content, or the like, to associated receiver endpoints.

As referred to herein, a work queue(s) or work-descriptor queue(s) may be a queue of one or more tasks.

As referred to herein, a queue pair(s) (QP) may, for example, be a connection between a transmitter and a receiver, which may be identified by a QP identifier.

High-performance AI applications may utilize high bandwidth network communication along with predictable tail latency. Congestion on the network may directly affect the tail latencies and thereby affect the performance of the end applications. To reduce the effects of network congestion, a network device may arbitrate across a very large number of connections (e.g., QP) so that a connection is not conflicting with another device and creating network congestion. One approach may be to arbitrate at the connection level to determine which connection may communicate at a given time. However, as the bandwidth increases, the per-packet time decreases, adding additional challenges to scale for large numbers of connections.

The examples of the present disclosure (e.g., an RDMA transport process) may reduce congestion at a network endpoint by initiating receiver-driven traffic scheduling, thereby pacing traffic in an efficient and network traffic conserving manner. To facilitate the subject technology at scale, the pacing functionality may include dynamic rate adjustment across multiple active connections (e.g., QPs) at the packet-level.

Figure 1:
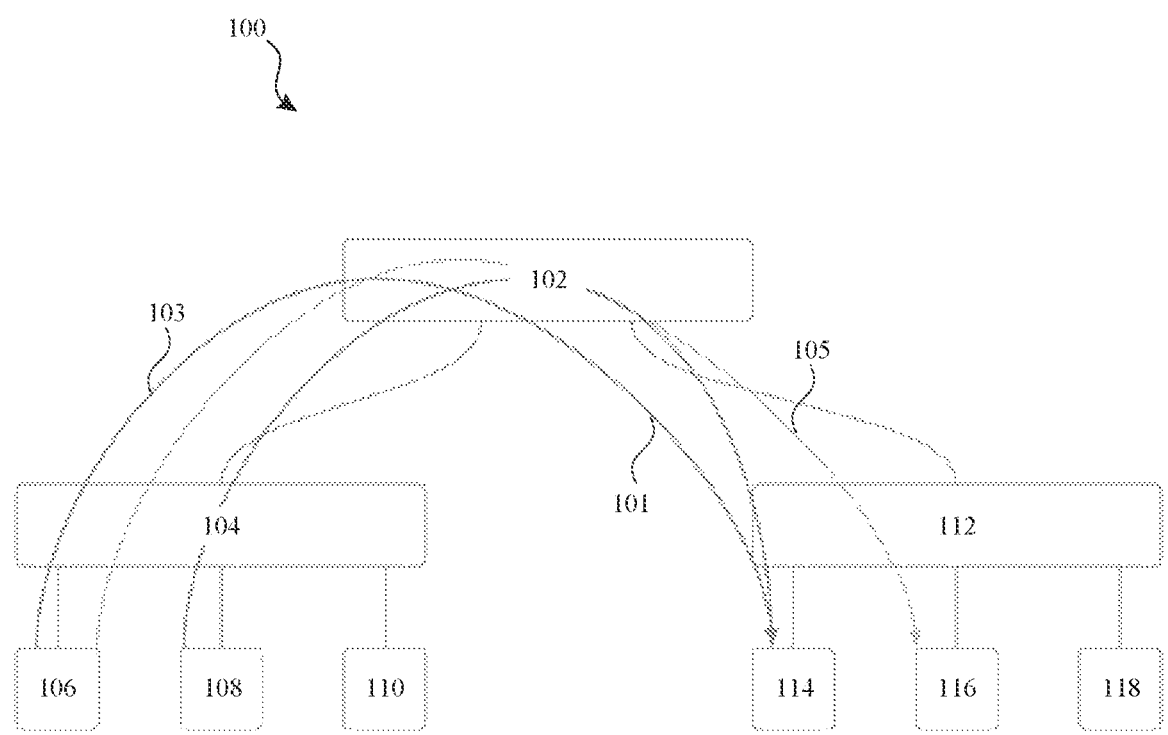
FIG. 1 illustrates an example network environment, in accordance with one or more examples of the subject technology.

FIG. 1 illustrates a network environment 100, in accordance with one or more examples of the present disclosure. The network environment 100 may include a network device 102. The network device 102 may be one or more servers, switches, and/or the like that establish a connection (e.g., via wide area network (WAN), local area network (LAN), etc.) between one or more local network devices 104, 112 that are connected to one or more computing devices 106, 108, 110, 114, 116, 118. The local network devices 104, 112 may be similar to the network device 102. For example, the local network device 104 may be a switch that connects the computing devices 106, 108, 110 so that they may communicate with each other and any other computing devices 114, 116, 118 that are connected to the same network device 102 (directly or indirectly (e.g., via network devices 104, 112)).

The computing devices 106, 108, 110, 114, 116, 118 may be any kind/type of AI/ML accelerator, such as for example graphics processing units (GPUs). The computing devices 106, 108, 110, 114, 116, 118 may include or be associated with a network interface card (NIC) configured to implement an RDMA engine for performing RDMA communications. RDMA communications may include three types of queues: send, receive, and completion. The send and receive queue may be generated in a pair and are referred to as a queue pair. The RDMA engine may be based on a networking protocol that allows RDMA over an Ethernet network (referred to as RDMA over Converged Ethernet or RoCE), which may be on the Ethernet level or the Internet level.

In the network environment 100, the computing device 106 may send data to the computing devices 114, 116. However, computing device 114 has multiple incasts 101, 103, receiving data from both the computing devices 106, 108, causing the transmission rate to be divided between incasts 101, 103. As such, communications from the computing device 106 to the computing device 114 may have a lower transmission rate than communications from the computing device 106 to the computing device 116, which may have one incast 105 for example. In some examples, communications from the computing device 106 to the computing device 114 may have a lower transmission rate than communications from the computing device 106 to the computing device 116 based on speed mismatch, different ratios of an outcast(s) and/or incast(s), etc. For example, consider an instance in which computing device 114 and computing device 116 may have a same reception rate, and in which both computing device 106 and computing device 108 are sending traffic to computing device 114. In this regard, the transmission rate of computing device 106 and computing device 108 may be half. On the other hand, as an example, computing device 106 may transmit/send traffic (e.g., packets) to computing device 116 at a full transmission rate (e.g., 800 Gbps) since computing device 116 may have one source of traffic in this example. The examples of the present disclosure may arbitrate between different destination QPs having different rates (e.g., computing device 106 to computing device 114 versus computing device 106 to computing device 116), which manages potential congestion and allows for high-performance AI/ML systems to scale more effectively than other approaches.

Figure 2:
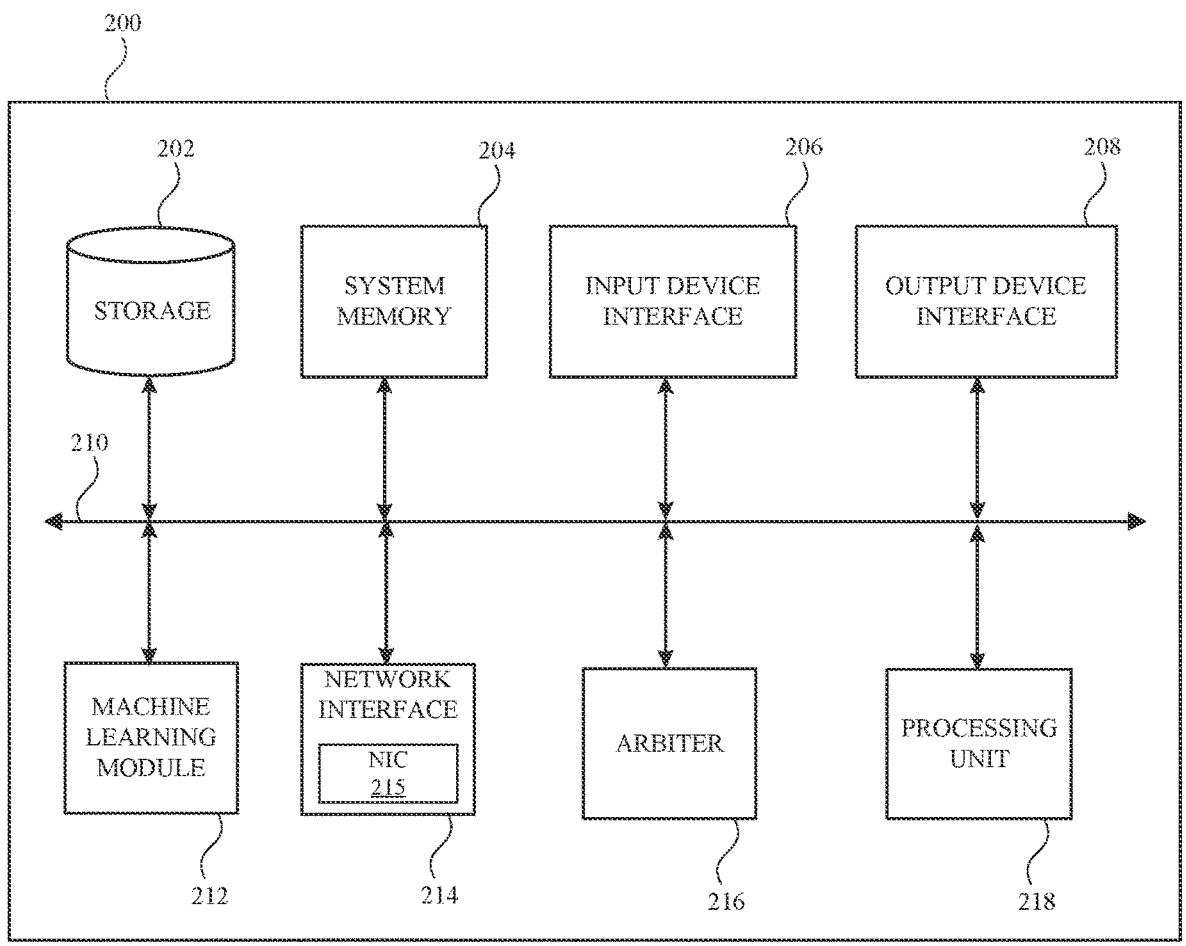
FIG. 2 illustrates an example AI accelerator, in accordance with one or more examples of the subject technology.

FIG. 2 illustrates an example computing device 200, in accordance with one or more examples of the subject technology. The computing device 200 may be, and/or may be a part of, an accelerator for AI/ML applications (e.g., GPUs, field-programmable gate arrays (FPGAs), application-specific integrated circuits (ASICs)). The computing device 200 may include various types of computer-readable media and interfaces for various other types of computer-readable media. The computing device 200 includes a bus 210, a system memory 204, a storage device 202, an input device interface 206, an output device interface 208, a machine learning module 212, a network interface 214, an arbiter 216, and a processing unit 218, or subsets and variations thereof. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

The bus 210 collectively represents all system, peripheral, and chipset buses that communicatively connect the numerous internal devices of the computing device 200. In one or more embodiments, the bus 210 communicatively connects the processing unit 218 with the other components of the computing device 200. From various memory units, the processing unit 218 retrieves instructions to execute and data to process in order to execute the operations of the subject disclosure. The processing unit 218 may be a controller and/or a single- or multi-core processor or processors in various embodiments.

The storage device 202 may be a read-and-write memory device. The storage device 202 may be a non-volatile memory unit that stores instructions and data (e.g., static and dynamic instructions and data) even when the computing device 200 is off. In one or more embodiments, a mass-storage device (such as a magnetic or optical disk and its corresponding disk drive) may be used as the storage device 202. In one or more embodiments, a removable storage device (such as a floppy disk, flash drive, and its corresponding disk drive) may be used as the storage device 202.

Like the storage device 202, the system memory 204 may be a read-and-write memory device. However, unlike the storage device 202, the system memory 204 may be a volatile read-and-write memory, such as random-access memory. The system memory 204 may store any of the instructions and data that one or more processing unit 218 may need at runtime to perform operations. In one or more embodiments, the processes of the subject disclosure are stored in the system memory 204 and/or the storage device 202. From these various memory units, the one or more processing unit 218 retrieves instructions to execute and data to process in order to execute the processes of one or more embodiments, discussed below. The system memory 204 may include one or more buffers. Buffers for RDMA applications may include send queues, receive queues, completion queues, work queue elements (e.g., work-descriptor queue elements), completion queue elements, and the like.

Embodiments within the scope of the present disclosure may be partially or entirely realized using a tangible computer-readable storage medium (or multiple tangible computer-readable storage media of one or more types) encoding one or more instructions. The tangible computer-readable storage medium also may be non-transitory in nature.

The computer-readable storage medium may be any storage medium that may be read, written, or otherwise accessed by a general purpose or special purpose computing device, including any processing electronics and/or processing circuitry capable of executing instructions. For example, without limitation, the computer-readable medium may include any volatile semiconductor memory (e.g., the system memory 204), such as RAM, DRAM, SRAM, T-RAM, Z-RAM, and TTRAM. The computer-readable medium also may include any non-volatile semiconductor memory (e.g., the storage device 202), such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium may include any non-semiconductor memory, such as optical disk storage, magnetic disk storage, magnetic tape, other magnetic storage devices, or any other medium capable of storing one or more instructions. In one or more embodiments, the tangible computer-readable storage medium may be directly coupled to a computing device, while in other embodiments, the tangible computer-readable storage medium may be indirectly coupled to a computing device, e.g., via one or more wired connections, one or more wireless connections, or any combination thereof.

Instructions may be directly executable or may be used to develop executable instructions. For example, instructions may be realized as executable or non-executable machine code or as instructions in a high-level language that may be compiled to produce executable or non-executable machine code. Further, instructions also may be realized as or may include data. Computer-executable instructions also may be organized in any format, including routines, subroutines, programs, data structures, objects, modules, applications, applets, functions, etc. As recognized by those of skill in the art, details including, but not limited to, the number, structure, sequence, and organization of instructions may vary significantly without varying the underlying logic, function, processing, and output.

While the above discussion primarily refers to microprocessors or multi-core processors that execute software, one or more embodiments are performed by one or more integrated circuits, such as ASICs or FPGAs. In one or more embodiments, such integrated circuits execute instructions that are stored on the circuit itself.

The bus 210 also connects to the input device interface 206 and output device interface 208. The input device interface 206 enables the system to receive inputs. For example, the input device interface 206 allows a user to communicate information and select commands on the computing device 200. The input device interface 206 may be used with input devices such as keyboards, mice, dials, switches, sliders, and other interfaces (physical or virtual) for a user to supply information to the computing device 200. The output device interface 208 may be used with output devices such as displays, speakers, and other interfaces (physical or virtual) for the computing device 200 to provide information. One or more embodiments may include devices that function as both input and output devices, such as a touchscreen.

The computing device 200 may also contain a machine learning module 212. The machine learning module 212 may be a hardware and/or software module that includes machine learning logic. Machine learning logic may be embodied in the form of computer-readable instructions and may include representation learning, feature learning, convolutional neural networks, artificial neural networks, graph neural networks, attention models, image recognition models, and the like. The machine learning module 212 may include one or more accelerators for AI/ML applications. The accelerators may be a GPU, FPGA, ASIC, and the like.

The bus 210 also couples the computing device 200 to one or more networks and/or to one or more network nodes through the network interface 214. The network interface 214 may include one or more interfaces that allow the computing device 200 to be a part of a network of computers (e.g., a local area network (LAN), a wide area network (WAN), or a network of networks (the Internet)). For example, the network interface 214 may include a network interface card (NIC) 215. In one or more implementations, the NIC 215 may be associated with one or more accelerators of the machine learning module 212.

The computing device 200 may also include an arbiter 216. The machine learning module 212 may be a hardware and/or software module that includes machine learning logic. The arbiter 216 may divide the QP arbitration into at least two parts. In the first part, QPs may be sorted and grouped with QPs of similar rates. In the second part, QPs may be efficiently moved between groups (e.g., by not copying any data but only changing the corresponding pointers). The arbiter 216 may arbitrate the QPs at the group level, which may be a constant number depending on how many groups are used. In one or more implementations, the arbiter 216 may be associated with one or more accelerators of the machine learning module 212 and/or the network interface 214.

Figure 3:
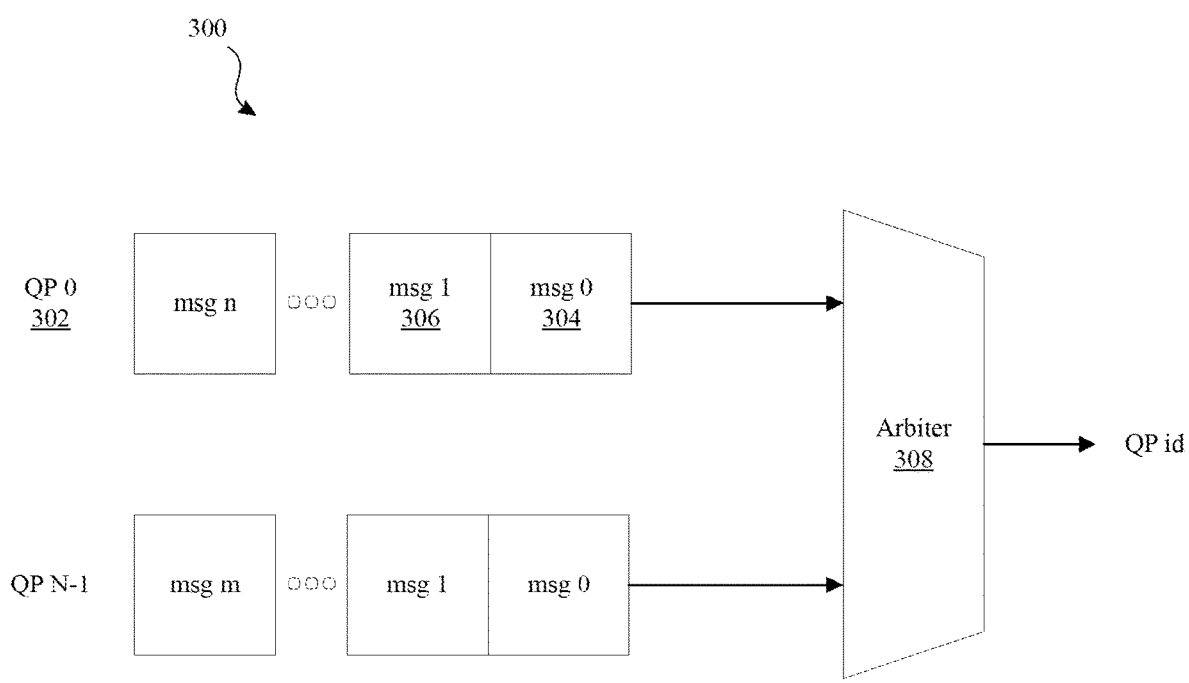
FIG. 3 illustrates a diagram of an example computing device.

FIG. 3 illustrates a diagram of a computing device 300. The computing device 300 may be an accelerator and/or a NIC. The computing device 300 includes an arbiter 308 and one or more QPs (e.g., QP0 320, QP N−1). Each QP may have multiple queued messages that are to be scheduled in an application-specified order. The QPs may include a send queue that may include one or more messages to be transmitted. For example, QP0 302 may have n messages: message0 304, message1 306, etc. In addition, depending on the destination, the segmentation of messages into network packets may vary.

When the arbiter 308 determines which transmitter's QP may transmit to the respective receiver's QP associated with a QP_id (also referred to as QP id), the computing device 300 may issue a packet to be transmitted from the selected QP, in which a message (e.g., message0 304) may be divided into multiple packets. However, as more QPs are added, more congestion may be introduced because the arbiter 308 may be functioning with a potentially infinite number of QPs. One aspect of the examples of the present disclosure may be to limit the number of items (e.g., data bandwidth) that the arbiter 308 selects from.

Figure 4:
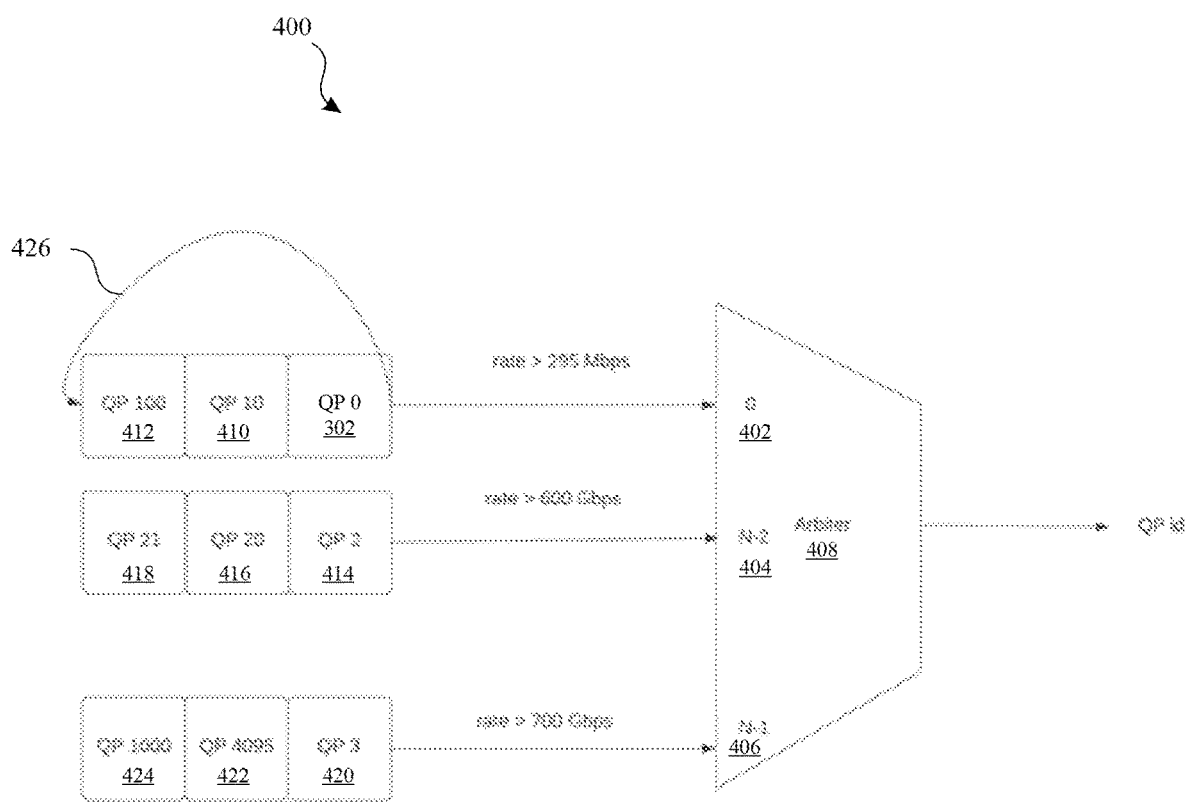
FIG. 4 illustrates a diagram of an example computing device, in accordance with one or more examples of the subject technology.

FIG. 4 illustrates a diagram of an example computing device 400, in accordance with one or more embodiments of the present disclosure. Not all depicted components may be used in all embodiments, however, and one or more embodiments may include additional or different components than those shown in the figure. Variations in the arrangement and type of the components may be made without departing from the spirit or scope of the claims as set forth herein. Additional components, different components, or fewer components may be provided.

To allow the system to scale as needed, the arbitration, by arbiter 408, may be independent of the number of QPs, limiting the number of items from which the arbiter 408 selects. In the computing device 400, the arbiter 408 may select from one or more groups 402, 404, 406 that may be aggregate QPs based on their transmission rates (e.g., from lowest transmission rate to highest transmission rate). For example, if an arbiter 408 is configured to select from 16 groups, then the transmission rate of the computing device 400 may be evenly distributed among the 16 groups. As another example, if the maximum transmission rate of the computing device 400 is 800 Gbps, the first group 402 may be greater than or equal to 295 Mbps, the second group 404 may be greater than 600 Gbps, and the third group may be greater than 700 Gbps but may not exceed the maximum transmission rate of 800 Gbps (e.g., one or more groups between the first group 402 and the second group 404 may include one or more ranges between 295 megabit per second (Mbps) and 600 gigabit per second (Gbps)). In this example, 800 Gbps may be the highest transmission rate a packet(s) may be sent by a communication device(s) and 295 Mbps may be the lowest transmission rate a packet(s) may be sent by a communication device(s). As such, the groups 402, 404 may have transmission rates that are partitioned from the lowest transmission rate(s) to the highest transmission rate(s).

QPs are grouped according to their transmission rate such that they are grouped with other QPs having similar rates. This makes the arbitration a factor of how many groups of rates may be created rather than the number of QPs as was the case with the computing device 300. For example, as shown in FIG. 4, QP0 302, QP10 410, and QP100 412 may have a transmission rate between 295 Mbps and 600 Gbps; QP2 414, QP20 416, and QP21 418 may have a transmission rate between 600 Gbps and 700 Gbps; and QP3 420, QP4095 422, and QP1000 424 may have a transmission rate greater than 700 Gbps.

For each arbitration, if a QP at the head of a transmission schedule of a group is unavailable to transmit, the arbiter 408 may move a head pointer to the tail of the transmission schedule of a group (as illustrated by line 426) and may make the next pointer as the head of the group. This prevents the head of the transmission schedule line from blocking the group from transmitting.

Figure 5:
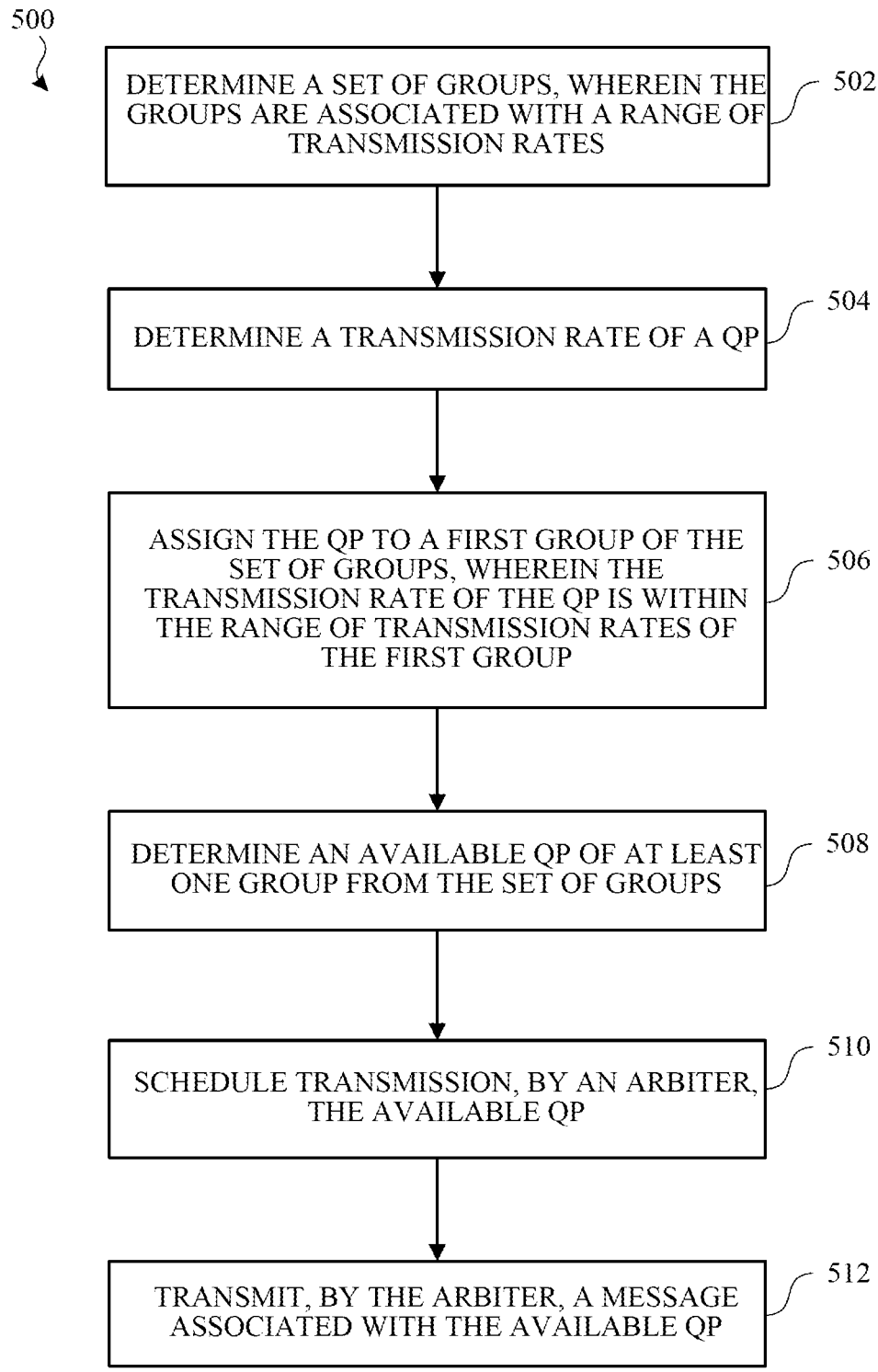
FIG. 5 illustrates a flow diagram of an exemplary process for RDMA transmit flow scheduling and pacing, in accordance with one or more examples of the subject technology.

FIG. 5 illustrates a flow diagram of a process 500 for RDMA transmit flow scheduling and pacing, in accordance with one or more embodiments of the present disclosure. For explanatory purposes, the process 500 is primarily described herein with reference to FIG. 2 and FIG. 4. However, the process 500 is not limited to the items shown in FIG. 2 and FIG. 4, and one or more blocks (or operations) of the process 500 may be performed by one or more other components of other suitable devices. Further, for explanatory purposes, the blocks of the process 500 are described herein as occurring in serial or linearly. However, multiple blocks of the process 500 may occur in parallel. In addition, the blocks of the process 500 need not be performed in the order shown and/or one or more blocks of the process 500 need not be performed and/or may be replaced by other operations.

In the process 500, at block 502, the computing device (e.g., computing device 106) may determine a set of groups. The determination may be based on a transmission rate of the computing device (e.g., a maximum bandwidth according to a service-level agreement (SLA)) and the number of groups to be generated. The number of groups may be predetermined or dynamically determined as a function of variables such as the number of QPs, the current number of groups, the available bandwidth, the amount of out-/in-bound data, and/or any other data-related characteristic. The transmission rate range of the groups may be based on an even distribution of the maximum bandwidth. For example, if an arbiter (e.g., arbiter 408) is configured to select from 16 groups, then the transmission rate of the computing device may be evenly distributed among the 16 groups. The transmission rate range of the groups may instead be based on an uneven distribution of the maximum bandwidth due to anticipated workloads or other factors impacting transmission. For example, assuming there are four groups and a transmission rate of 500 Gbps, the first group may be 0-100 Gbps, the second group may be 100-200 Gbps, and the third group may be 200-300 Gbps; however, if there are (or are anticipated to be) fewer QPs that have a transmission rate of 300-500 Gbps than the other groups, then the fourth group may be 300-500 Gbps.

The groups may have an associated state. Each group may have a queue of QPs. The queue may be represented in a linked list data structure in which each QP is represented as a QP identifier (QP_id) pointer that points to the QP in memory, a next QP pointer that points to the next QP in the queue, and a previous QP pointer that points to the previous QP in the queue. The state of the group may have a head pointer and a tail pointer that identifies this queue by its head QP (e.g., QP_id of the head) and tail QP (e.g., QP_id of the tail). The state of the group may also have an indication of the range of transmission rates that the group represents. The order of the QPs in the queue may be based on one or more factors, including when the QP is added to the list, the priority of the QP, a predetermined transmission schedule, the amount of data the QP is to send, among other factors.

At block 504, the computing device may determine a transmission rate of a QP. In one example, the transmission rate of a QP may be based on the bandwidth/network resources available between two communicating nodes (computing devices 106, 114, etc.). When the QP is being established, one or more of the parties may send a message to another party. The message may be a handshake in which each party shares their information, such as their bandwidth. In this regard, for example, before transmission of data, there may be a handshake between two communication nodes which may enable determining the transmission rate of the QP.

The transmission rate of a QP may also or instead be based on an SLA and/or the number of incasts associated with a receiving node of the QP. For example, suppose the available bandwidth in the network environment 100 is 500 Gbps and the computing device 114 has two incasts (e.g., from computing devices 106, 108). In that case, the QPs associated with the incasts may be the available bandwidth divided by the number of incasts at the receiving computing device 114. Accordingly, the QP at computing device 106 transmitting to computing device 114 may have a 250 Gbps transmission rate.

The QPs may have an associated state. The state of a QP may be stored in memory and may be accessed by a QP_id. The state may include information such as the transmission rate of the QP, a descriptor head pointer that points to the first message of the QP, a descriptor tail pointer that points to the last message of the QP, a group pointer that points to the group in which the QP belongs.

At block 506, the computing device may assign the QP to a group. The QP may be grouped with other QPs having similar rates. The rate of the QP may be within the range of a group, and the QP may be assigned to a group corresponding to that range. The assigning of the QP to the group may include adding the QP to an end of a list associated with the group. In an instance in which the QP is added to the end of the list associated with the group, the tail pointer of the group state may be updated to point to the QP.

At block 508, the computing device (or components thereof, such as the arbiter (e.g., arbiter 408)) may select an available QP from a group of the set of groups. Selecting an available QP may include traversing the set of groups, accessing the list of a group, and determining whether the QP at the head of the list of the group is valid and/or has outstanding messages to send and/or receive.

The computing device may include an arbitration policy that determines how an available QP is selected. The arbitration policy may indicate that the set of groups may be traversed in a round-robin scheme, a weighted scheme, or any other scheme. The computing device traversing in a round-robin scheme may inspect the groups in order of their transmission ranges, names, etc. The computing device traversing in a weighted scheme may include inspecting the groups in order of their weights and/or weights of their associated QPs. Weights may be assigned to the group and/or QP when they are created (e.g., at block 502) and may be updated periodically. The weights may be an attribute of the group state and may be a function of the number of QPs associated with the group, the transmission rate range associated with the group, a priority of one or more QPs associated with the group, the number of transmissions sent and/or received by QPs of the group, and/or other variables.

If the head of the list of the group is not valid and/or does not have outstanding messages, the computing device may proceed to the next group and/or proceed down the list of the current group, as indicated in the arbitration policy. If the computing device proceeds to the next group, the computing device may update the list of the group to move the QP at the head over the list to another place in the list (e.g., the tail). If the computing device proceeds down the list of the current group, the head of the list may be moved to another place in the list (e.g., the tail) and the subsequent QP may be moved to the head of the list and examined for validity and/or outstanding messages. Proceeding to the next group and/or proceeding down the list of the current group may continue until a head of a list of a group that is valid and/or has outstanding messages is found. In one or more embodiments, the computing device may traverse the list, preserving the order of the list. In one or more implementations, the moving of QPs, such as within a list or between groups, may be performed by changing the pointers of the QP state and/or the group state so that the operation can be performed in constant time without introducing congestion when performing the moving operation.

At block 510, the computing device (or components thereof, such as the arbiter) may schedule the available QP to transmit one or more messages associated with the available QP. In an arbitration, the arbiter may move the available QP from the available QP's associated group to the tail of a transmission schedule (e.g., a list) of the arbiter. To improve the efficiency of this operation, for example, the arbiter may simply change the header pointer of the group to the QP following the available QP and change the tail pointer of the transmission schedule to the available QP. Changing the pointers of the available QP rather than moving the data of the available QP allows for the scheduling operation to occur a constant time so that congestion may not be introduced by this operation.

For example, assume an arbiter has eight groups with a transmission rate of 800 Gbps. The transmission rate may be evenly divided among the eight groups: 0-100 Gbps, 100-200 Gbps, etc. Assume also that the computing device receives two QPs, each with a transmission rate of 800 Gbps. Both QPs may be assigned to the eighth group (e.g., 700-800 Gbps). In an arbitration event, the arbiter iterates through each group, arriving at the eighth group and inspects the eight group as it is the only group with QPs. The head of the list of the eighth group, QP0, is examined (e.g., the QP state is examined) to determine whether QP0 is valid and/or has messages to send. If so, message(s) may be sent from QP0 and then QP0 is moved to the tail of the arbiter's transmission schedule and the head of the eighth group's list becomes QP1. At the next arbitration cycle, the computing device may determine whether QP1 is valid and/or has messages to send.

At block 512, the computing device (or components thereof, such as the arbiter) may transmit messages associated with the available QP. The computing device may transmit messages from one or more QPs in the order of the transmission schedule. In one or more embodiments, the arbitration policy may cause the computing device to access one or more weights associated with the available QP and/or its formerly associated group (which may be determined based on its transmission weight) and prioritize the transmission of messages from the one or more QPs in the order of their respective weights In one or more implementations, the transmission rate of one or more QPs may be updated. The change in transmission rates may be due to network factors, changes in incasts on the receiver associated with a QP, changes in maximum bandwidth according to the SLA, among other factors. Transmission rates of one or more QPs may be updated (e.g., in the respective QP state) after a period of time, a number of iterations of the arbiter, a number of sent messages from the computing device, a number of received messages from the computing device, a priority of the respective QP, among other factors.

In one or more implementations, one or more QPs may be moved from one group to another in an instance in which their respective transmission rates change. For example, assuming there are two groups—the first group 0-100 Gbps and the second group 100-200 Gbps—and a QP0 initially has a transmission rate of 50 Gbps and is subsequently updated to a transmission rate of 150 Gbps, the QP0 may be moved from the first group to the second group. The moving of the QPs between groups may include updating (e.g., transferring) QP pointers. For example, the list of pointers to QPs associated with a list of the first group may remove a pointer (e.g., QP_id) and send the pointer to the second group to include in the second group's list of pointers to QPs.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order or partitioned differently) without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged or that all illustrated blocks be performed. Any of the blocks may be performed simultaneously. In one or more embodiments, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

As used in this specification and any claims of this application, the terms "base station," "receiver," "computer," "server," "processor," and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole rather than each member of the list (i.e., each item). The phrase "at least one of" does not require the selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refers to only A, only B, or only C; any combination of A, B, and C; and/or at least one of each of A, B, and C.

The predicate words "configured to," "operable to," and "programmed to" do not imply any particular tangible or intangible modification of a subject but, rather, are intended to be used interchangeably. In one or more embodiments, a processor configured to monitor and control an operation or a component may also mean the processor being programmed to monitor and control the operation or the processor being operable to monitor and control the operation. Likewise, a processor configured to execute code may be construed as a processor programmed to execute code or operable to execute code.

Phrases such as an aspect, the aspect, another aspect, some aspects, one or more aspects, an implementation, the implementation, another implementation, some embodiments, one or more embodiments, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations or one or more configurations. A disclosure relating to such phrase(s) may provide one or more examples. A phrase such as an aspect or some aspects may refer to one or more aspects and vice versa, which applies similarly to other foregoing phrases.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the phrase "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public, regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine (e.g., her) and vice versa. Headings and subheadings, if any, are used for convenience only and do not limit the subject disclosure.

What is claimed is:

1. A method comprising:
   determining a set of groups, wherein groups in the set of groups are associated with a range of transmission rates;
   determining a transmission rate of a queue pair (QP);
   assigning the QP to a first group of the set of groups, wherein the transmission rate of the QP is within the range of transmission rates of the first group;
   determining an available QP associated with at least one group from the set of groups;
   scheduling transmission, by an arbiter, of the available QP; and
   transmitting, by the arbiter, a message associated with the available QP.

2. The method of claim 1, further comprising:
updating the transmission rate of the QP; and
reassigning the QP to a different group of the set of groups, in response to the updated transmission rate being within the range of transmission rates associated with the different group.

3. The method of claim 1, wherein the groups in the set of groups comprise a list of one or more QPs.

4. The method of claim 3, wherein the assigning the QP to the first group comprises adding the QP to an end of a list associated with the first group.

5. The method of claim 1, wherein the range of transmission rates associated with the groups in the set of groups is based on a second transmission rate associated with a service-level agreement and a quantity of groups.

6. The method of claim 5, wherein the transmission rate of the QP is based on the second transmission rate associated with the service-level agreement and a quantity of incasts associated with a receiving node of the QP.

7. The method of claim 1, wherein the determining the available QP comprises:
determining a group by traversing the set of groups; and
determining whether a head pointer of a list associated with the group comprises a QP comprising a second message.

8. The method of claim 1, wherein the determining of the available QP comprises:
determining whether a head pointer of a list associated with the first group comprises a second QP comprising a second message; and
determining whether a subsequent QP of the list of the first group comprises a third message, in response to determining that the head pointer associated with the list of the first group is associated with a third QP lacking a fourth message.

9. The method of claim 1, wherein the scheduling of the transmission comprises:
removing the available QP from the first group; and
adding the available QP to a list associated with the arbiter.

10. The method of claim 1, wherein the determining the available QP is according to an arbitration policy.

11. The method of claim 10, wherein the arbitration policy comprises an order of the set of groups for the determining the available QP.

12. The method of claim 10, wherein the arbitration policy causes the arbiter to access one or more weights associated with the available QP and to prioritize the transmitting the message associated with the available QP based on the one or more weights.

13. The method of claim 12, wherein the one or more weights are based on a quantity of QPs in the first group associated with the QP.

14. An apparatus comprising:
one or more processors; and
at least one memory storing instructions, that when executed by the one or more processors, cause the apparatus to:
determine a set of groups, wherein groups in the set of groups are associated with a range of transmission rates;
determine a transmission rate of a queue pair (QP);
assign the QP to a first group of the set of groups, wherein the transmission rate of the QP is within the range of transmission rates of the first group;
determine an available QP associated with at least one group from the set of groups;
schedule transmission of the available QP; and
transmit a message associated with the available QP.

15. The apparatus of claim 14, wherein when the one or more processors further execute the instructions, the apparatus is configured to:
update the transmission rate of the QP; and
reassign the QP to a different group of the set of groups, in response to the update of the transmission rate being within the range of transmission rates associated with the different group.

16. The apparatus of claim 14, wherein the groups in the set of groups comprise a list of one or more QPs.

17. The apparatus of claim 16, wherein when the one or more processors further execute the instructions, the apparatus is configured to:
perform the assign the QP to the first group comprises adding the QP to an end of a list associated with the first group.

18. The apparatus of claim 14, wherein the range of transmission rates associated with the groups in the set of groups is based on a second transmission rate associated with a service-level agreement and a quantity of groups.

19. A non-transitory computer-readable storage medium storing computer-executable instructions that, when executed, cause:
determining a set of groups, wherein groups in the set of groups are associated with a range of transmission rates;
determining a transmission rate of a queue pair (QP);
assigning the QP to a first group of the set of groups, wherein the transmission rate of the QP is within the range of transmission rates of the first group;
determining an available QP associated with at least one group from the set of groups;
scheduling transmission, by an arbiter, of the available QP; and
transmitting, by the arbiter, a message associated with the available QP.

20. The computer-readable storage medium of claim 19, wherein the instructions, when executed, further cause:
updating the transmission rate of the QP; and
reassigning the QP to a different group of the set of groups, in response to the updating of the transmission rate being within the range of transmission rates associated with the different group.

* * * * *